US008530111B2

(12) United States Patent
Cha et al.

(10) Patent No.: US 8,530,111 B2
(45) Date of Patent: Sep. 10, 2013

(54) FUEL CELL

(75) Inventors: Hye-Yeon Cha, Yongin-si (KR);
Young-Soo Oh, Seongnam-si (KR);
Jae-Hyuk Jang, Seoul (KR); Sung-Han Kim, Suwon-si (KR); Craig Miesse, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 824 days.

(21) Appl. No.: 12/385,842

(22) Filed: Apr. 21, 2009

(65) Prior Publication Data
US 2009/0269648 A1  Oct. 29, 2009

(30) Foreign Application Priority Data
Apr. 24, 2008  (KR) .................. 10-2008-0038353

(51) Int. Cl.
*H01M 8/02*  (2006.01)
(52) U.S. Cl.
USPC .......................................... 429/508; 429/511

(58) Field of Classification Search
USPC ........................................ 429/507, 508, 511
See application file for complete search history.

(56) References Cited

U.S. PATENT DOCUMENTS 7,455,928 B2 * 11/2008 Mathias et al. ............... 429/483
2006/0141318 A1 * 6/2006 MacKinnon et al. ......... 428/457

* cited by examiner

*Primary Examiner* — Stephen J. Kalafut

(57) ABSTRACT

A fuel cell is disclosed. The fuel cell can include a membrane electrode assembly (MEA), converting a chemical energy to an electrical energy; a first end plate, stacked on one surface of the MEA and formed with a first coupling hole; a second end plate, stacked on the other surface of the MEA; and a protrusion, formed on the second end plate such that the protrusion penetrates the first coupling hole and an end part of the protrusion protrudes a surface of the first end plate, and the end part being transformed such that the end part couples the first end plate and the second end plate. With the present invention, the fuel cell can reduce contact resistance between elements and its overall size and prevent a leak of fuel. In the manufacturing process, the end plates and the MEA can be arranged, improving reproducibility and repetition for mass production.

2 Claims, 3 Drawing Sheets

FUEL CELL

CROSS-REFERENCE TO RELATED APPLICATIONS

This application claims the benefit of Korean Patent Application No. 10-2008-0038353 filed with the Korean Intellectual Property Office on Apr. 24, 2008, the disclosure of which is incorporated herein by reference in its entirety.

BACKGROUND

1. Technical Field

The present invention relates to a fuel cell

2. Description of the Related Art

Today, portable electronic apparatuses are being provided in smaller sizes and with a greater variety of functions, and accordingly, there has been a demand for higher efficiency and longer operation times in devices for supplying electrical power to such portable electronic apparatuses. In this context, the fuel cell, which converts chemical energy directly into electrical energy, is gaining importance as a new alternative for radically increasing the efficiency and durability of a portable power supply.

According to the related art, the fuel cell is manufactured by stacking current collectors, flow field plates, and a membrane electrode assembly having an anode, a cathode, and an electrolyte membrane, and then applying pressure evenly using end plates. Here, thick end plates are tightened together using a fastening means such as bolts, in order to improve the efficiency by reducing contact resistance between pertinent elements and preventing a leak of fuel. Accordingly, the overall size of the fuel cell is increased, thereby making it difficult to employ the fuel cell in portable electronic apparatuses.

SUMMARY

The present invention provides a fuel cell that can reduce contact resistance between pertinent elements and its overall size and prevent a leak of fuel.

An aspect of the invention features a fuel cell including a membrane electrode assembly (MEA), configured to convert a chemical energy to an electrical energy; a first end plate, stacked on one surface of the MEA and formed with a first coupling hole; a second end plate, stacked on the other surface of the MEA; and a protrusion, formed on the second end plate such that the protrusion penetrates the first coupling hole and an end part of the protrusion protrudes a surface of the first end plate, and the end part being transformed such that the end part couples the first end plate and the second end plate.

The end part of the protrusion can be transformed not to protrude to a surface of the first end plate.

The MEA can be formed with a second coupling hole, a plurality of first coupling holes can be formed such that at least some of the first coupling holes correspond to the second coupling hole, and a plurality of protrusions can be formed such that at least some of the protrusions penetrate the second coupling hole.

DETAIL DESCRIPTION

Figure 1:
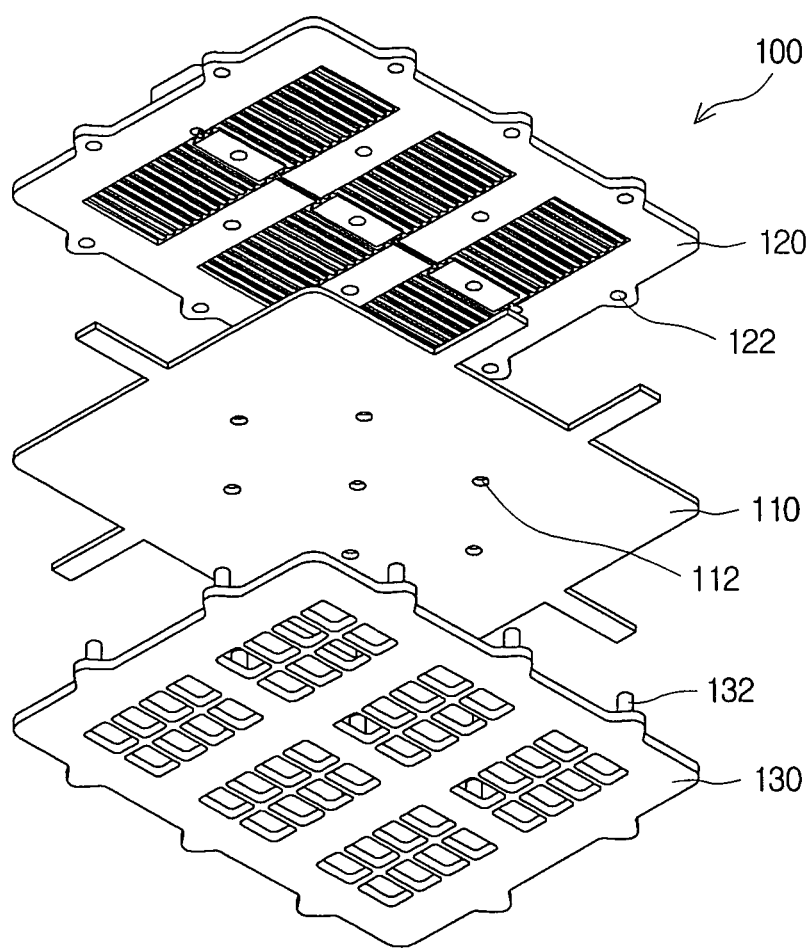
FIG. 1 is an exploded perspective view showing a fuel cell in accordance with an embodiment of the present invention.

A fuel cell according to certain embodiments of the invention will be described below in more detail with reference to the accompanying drawings. Those elements that are the same or are in correspondence are rendered the same reference numeral regardless of the figure number, and redundant explanations can be omitted.

When one element is described as being "stacked on" or "coupled to" another element, it shall be construed not only as being stacked on or coupled to another element directly but also as possibly having yet another element in between.

Figure 2:
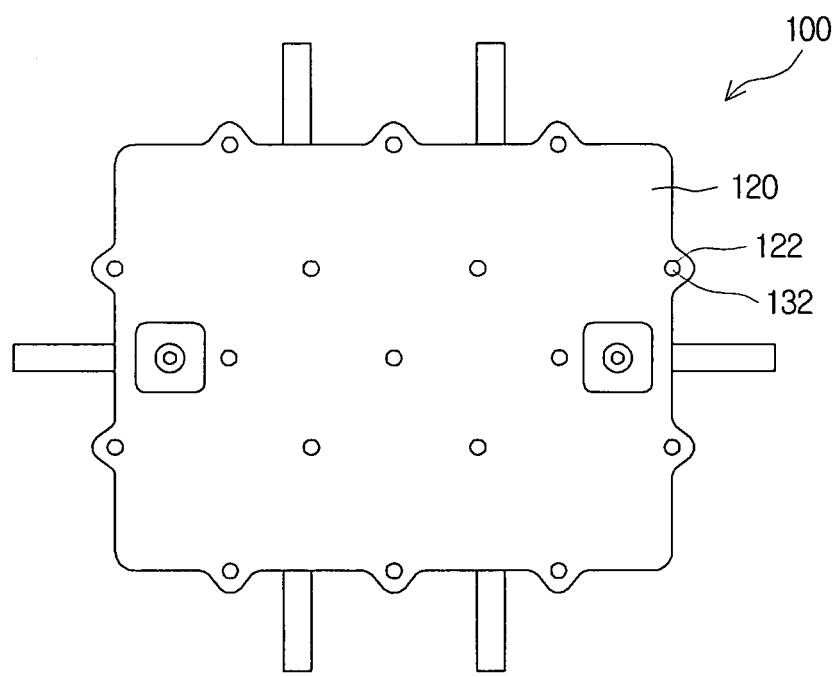
FIG. 2 is a plan view showing a fuel cell in accordance with an embodiment of the present invention.
Figure 3:
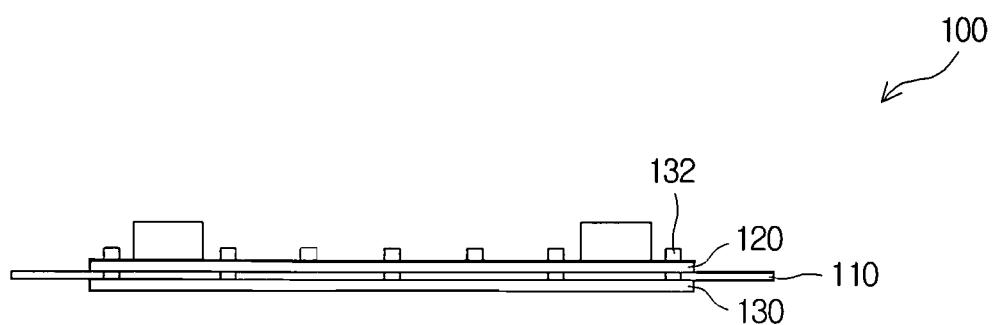
FIG. 3 is a front view showing an end part of a protrusion of a fuel cell before the end part is transformed in accordance with an embodiment of the present invention.

FIG. 1 is an exploded perspective view showing a fuel cell in accordance with an embodiment of the present invention, and FIG. 2 is a plan view showing a fuel cell in accordance with an embodiment of the present invention. FIG. 3 is a front view showing an end part of a protrusion of a fuel cell before the end part is transformed in accordance with an embodiment of the present invention.

In FIG. 1 through FIG. 3, there are shown a fuel cell 100, a membrane electrode assembly (MEA) 110, a first coupling hole 122, a first end plate 120, a second coupling hole 112, a second end plate 130, and a protrusion 132.

In accordance with an embodiment of the present invention, the fuel cell 100 can reduce contact resistance between pertinent elements and its overall size and weight and prevent a leak of fuel. Moreover, in the manufacturing process, the end plates and the MEA 110 can be easily and precisely arranged, thereby improving reproducibility and repetition required for mass production.

The MEA 110 can convert chemical energy to electrical energy. Herein, the MEA 110 can be formed to include an anode, a cathode, and an electrolyte membrane interposed therebetween. Below described in detail are the anode, the cathode, and the electrolyte membrane.

The electrolyte membrane can be interposed between the anode and the cathode and move hydrogen ions generated by an oxidation reaction at the anode to the cathode. It can be also possible to use a polymer material.

In particular, the anode can be formed on one side of the electrolyte membrane and be supplied with a fuel such as hydrogen or methanol, and then can undergo an oxidation reaction at a catalyst layer of the anode to generate hydrogen ions and electrons. The cathode can be formed on the other side of the electrolyte membrane and be supplied with oxygen and the electrons generated at the anode, and then can undergo a reduction reaction at the catalyst layers of the cathodes to generate oxygen ions.

The anode and the corresponding cathode can generate electrical energy through the chemical reactions as shown in the following reaction schemes 1 and 2 according to the type of the fuel. Here, the reaction scheme 1 is related to hydrogen, and the reaction scheme 2 is related to methanol.

[Reaction Scheme 1]

| | |
|---|---|
| Anode: | $H_2 \rightarrow 2H^+ + 2e^-$ |
| Cathode: | $O_2 + 4H^+ + 4e^- \rightarrow 2H_2O$ |
| Overall Reaction: | $2H_2 + O_2 \rightarrow 2H_2O$ |

[Reaction Scheme 2]

Anode: $CH_3OH + H_2O \rightarrow CO_2 + 6H^+ + 6e^-$
Cathode: $1.5O_2 + 6H^+ + 6e^- \rightarrow 3H_2O$
Overall Reaction: $CH_3OH + 1.5O_2 \rightarrow CO_2 + 2H_2O$ The first end plate 120 can be stacked on one surface of the MEA 110 and be formed with the first coupling hole 122. In particular, the first end plate 120 can be formed with the first coupling hole 122 to be penetrated by the protrusion 132 being formed on the second end plate 130 such that the first end plate 120 can be coupled to the second end plate 130 by the transformation of an end part of the protrusion 132 to provide a pressure to the MEA 110. A length of the protrusion 132, which is formed on a first surface of the second end plate 130, is larger than a thickness of the first end plate 120.

The first coupling hole 122 can be formed in various ways by using chemical or mechanical methods using a laser or a drill.

The second end plate 130 can be stacked on the other surface of MEA 110 and be coupled to the first end plate 120 by the protrusion 132 penetrating the first coupling hole 122.

The protrusion 132 can be formed on the second end plate 130 such that the protrusion 132 can penetrate the first coupling hole 122 and an end part of the protrusion 132 protrude to the surface of the first end plate 120. The end part of the protrusion 132 can be transformed to have a dome, mushroom or plate shape, for example, such that the first end plate 120 can be coupled to the second end plate 130. Accordingly, the first end plate 120 can be coupled to the second end plate 130 by the transformation of the end part of the protrusion 132.

In other words, the second end plate 130 can be formed with the protrusion 132 for being coupled to the first end plate 120, and the protrusion 132 can penetrate the first coupling hole 122 of the first end plate 120. Accordingly, the MEA 110 can be stacked on the second end plate 130, and the first end plate 120 can be stacked such that the protrusion 132 can penetrate the first coupling hole 122. Then, an end part of the protrusion 132, which protrudes to a surface of the first end plate 120, can be transformed to have a dome, mushroom or plate shape by physical pressure. Accordingly, the first end plate 120 and the second end plate 130 can be compressed and coupled to each other.

Since the first end plate 120 and the second end plate 130 are coupled to each other by the transformation of the end part of the protrusion 132, the first end plate 120 and the second end plate 130, which are closely coupled to each other, can provide strong pressure to the MEA 110 and prevent a leak of fuel. Moreover, using no fastening means such as bolts can reduce the overall thickness of the fuel cell 100 as compared with using the fastening means to couple the first end plate 120 to the second end plate 130 according to the related art.

Moreover, since the protrusion 132 is formed on the second end plate 130 as one body, the first end plate 120, the MEA 110, and the second end plate 130 can be arranged by arranging positions of the MEA 110 and the first end plate 120. This can help to manufacture the fuel cell 100 more easily. Accordingly, the reproducibility and repetition of workers can be improved, thereby manufacturing the fuel cell 100 in great quantities without difficulty.

On the other hands, when the first end plate 120 is coupled to the second end plate 130 through the protrusion 132, the end part of the protrusion 132 can be transformed not to protrude to a surface of the first end plate 120. In other words, when the first end plate 120 is coupled to the second end plate 130 by physically pressing an end part of the protrusion 132 formed on the second end plate 130 as one body, the end part of the protrusion 132 can be transformed and flatten to have a thin plate shape, thereby reducing the overall thickness of the fuel cell 100 efficiently.

Alternatively, the MEA 100 can be formed with a plurality of second coupling hole 112, and a plurality of first coupling holes 122 can be also formed on the first end plate 120 such that at least some of the first coupling holes 122 can correspond to the second coupling holes 122. A plurality of protrusions 132 can be formed on the second end plate 130 as one body such that at least some of the protrusions 132 can penetrate the second coupling holes 112.

In other words, since the MEA 110 can be formed with the second coupling holes 112 and the protrusions 132, formed on the second end plate 130 as one body, and some of the first coupling holes 122 of the first end plate 120 can be formed to correspond to the second coupling holes 112, outer parts of the end plates on which no MEA 110 is stacked can be coupled to each other by the transformation of the end part of the protrusion 132, and simultaneously, the parts on which the MEA 110 is stacked can be coupled to each other by the transformation of the end part of the protrusion 132. This can provide strong and uniform pressure to the MEA 110, and as a result, it can be possible to reduce contact resistance between pertinent elements and prevent a leak of fuel efficiently.

If all of the protrusions 132 and the first coupling holes 122 correspond to the second coupling holes 112, or if the protrusions 132, the first coupling holes 122 and the second coupling holes, all having the same number, can placed at the positions that correspond to each other, the parts on which the MEA 110 is stacked can coupled to each other by the transformation of the end part of the protrusion 132.

Like the first coupling hole 122, the second coupling hole 112 can be formed in various ways by using chemical or mechanical methods using a laser or a drill.

On the other hand, the first end plate 120 and the second end plate 130 can be made of a metal or a plastic, and in the case of the metal, the end plates 120 and 130 may be required to undergo an anodizing process or to be coated by using a Tefron for insulation.

Many embodiments other than those set forth above can be found in the appended claims.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

What is claimed is:
1. A fuel cell, comprising:
a membrane electrode assembly (MEA), configured to convert a chemical energy to an electrical energy;
a first end plate, stacked on a first surface of the MEA and formed with a first coupling hole, a first surface of the first end plate facing the first surface of the MEA and the first coupling hole penetrating the first end plate;
a second end plate, stacked on a second surface of the MEA, a first surface of the second end plate facing the second surface of the MEA; and
a protrusion, formed on the first surface of the second end plate such that the protrusion penetrates the first coupling hole from the first surface of the first end plate to a second surface of the first end plate and an end part of the protrusion protrudes from the second surface of the first end plate, a length of the protrusion being larger than a thickness of the first end plate, wherein the end part of the protrusion is transformed to have a dome, mushroom or plate shape by physical pressure, and the first end plate and the second end plate are compressed and coupled to each other by transformation of the end part of the protrusion.

2. The fuel cell of claim 1, wherein the MEA is formed with a second coupling hole, a plurality of first coupling holes are formed such that at least some of the first coupling holes correspond to the second coupling hole, and a plurality of protrusions are formed such that at least some of the protrusions penetrate the second coupling hole.

* * * * *